March 5, 1935.   F. S. DENISON   1,993,262
TEMPERATURE CHANGING SYSTEM EMPLOYING A CIRCULATING FLUID MEDIUM
Original Filed Nov. 10, 1933
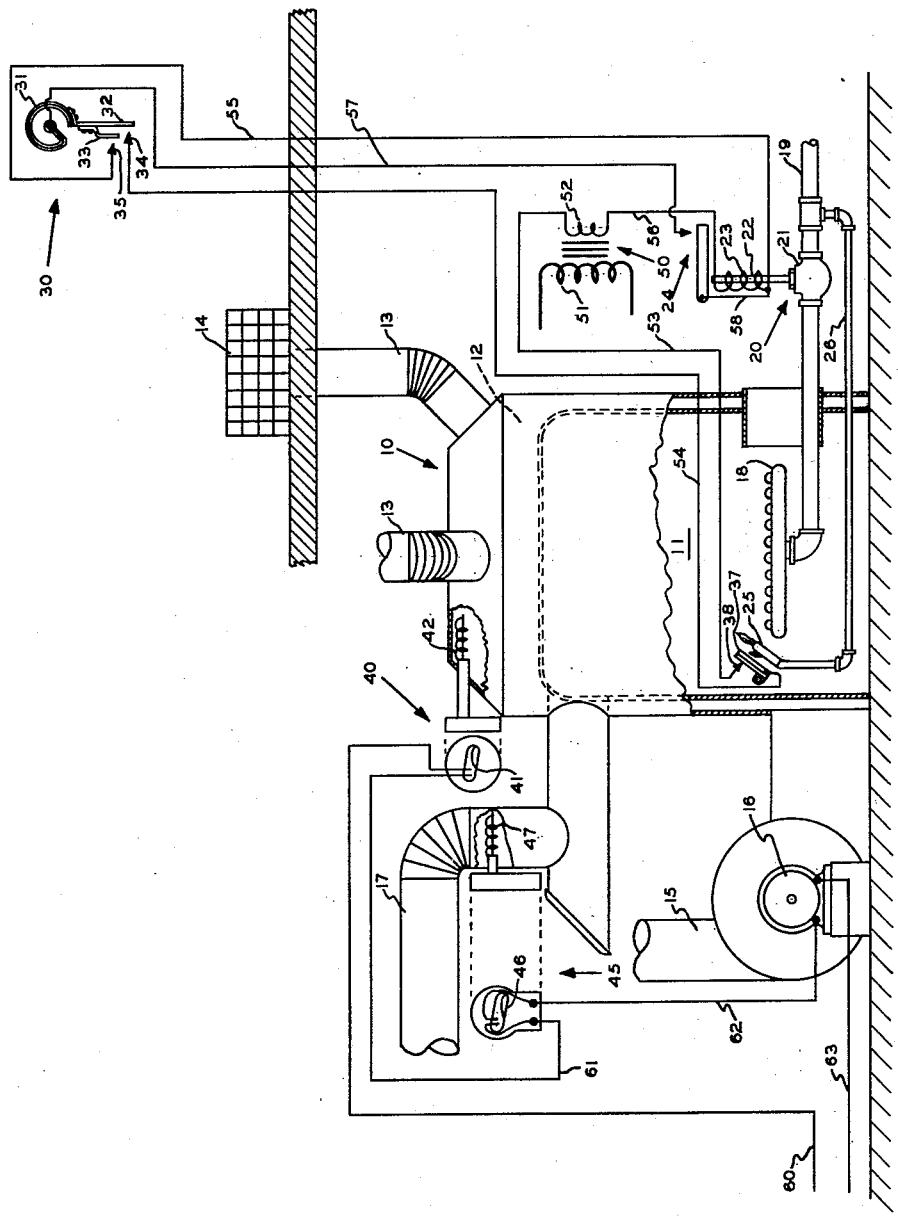
Inventor
FREDERICK S. DENISON
By George H. Fisher
Attorney Patented Mar. 5, 1935

1,993,262

UNITED STATES PATENT OFFICE 1,993,262

TEMPERATURE CHANGING SYSTEM EMPLOYING A CIRCULATING FLUID MEDIUM

Frederick S. Denison, Minneapolis, Minn., assignor to Minneapolis-Honeywell Regulator Company, Minneapolis, Minn., a corporation of Delaware Application November 10, 1933, Serial No. 697,427
Renewed August 4, 1934

25 Claims. (Cl. 236—11)

The present invention relates to the art of controlling temperatures by means of a circulating fluid medium, the heat content of which is changed by suitable means in any number of manners now well-known in the art. The invention relates particularly to the novel means by which the circulation of the fluid medium is controlled.

In prior art heating systems utilizing warm air furnaces for example, it has been common to employ a main control such as a room thermostat for increasing the rate of combustion when the temperature of the room falls below the desired value and also operating a fan or other circulation controlling means from the main control or room thermostat so as to circulate heated air to the room or space. It often happens that the main control and combustion rate varying means are installed and serviced by one organization, whereas the fan or other circulator and perhaps the furnace itself is installed and serviced by another organization. When the fan or blower is installed and/or serviced by one organization and the combustion rate varying means is installed and/or serviced by a different organization, it may be desirable to entirely segregate the control systems for the fan or blower and the combustion rate varying means.

For this and other reasons, the present invention contemplates the segregation of the control systems for the fan or circulator and the combustion rate varying means so that there is no interconnection, either electrical or mechanical, between the two control systems and with a minimum of expense and duplication of controls.

One of the objects of the present invention is the provision of a temperature changing system including a circulating fluid medium having means for controlling the circulation thereof, a device for changing the heat content of the fluid medium and a main control device for controlling the heat content changing means, together with means responsive to the temperature of the fluid medium and means responsive to a change in the rate at which the heat content of the fluid medium is varied for conjointly controlling the operation of the circulation controlling means independently of the main control device.

Another object of the invention is the provision of a heating system which includes a heater for heating a circulating fluid medium having means for controlling the circulation thereof, combustion rate varying means for varying the rate of the combustion in the heater and a main control for controlling the combustion rate varying means, together with a thermostat operating at fixed temperatures and responsive to the temperature of the fluid medium and a thermostat operating upon temperature changes, as distinguished from one which operates at fixed temperatures, responsive to changes in the temperature of combustion, the two thermostats conjointly controlling the operation of the circulation controlling means independently of the control for the combustion rate varying means.

A further object of the invention is the provision of a heating system for heating a fluid medium having electrically controlled means for controlling the circulation thereof, combustion rate varying means for the heater and a main control for operating the latter in combination with a thermostatic switch responsive to the temperature of the fluid medium which is closed when the fluid medium temperature is at or above a predetermined minimum value and a combustion responsive switch which closes upon a rise in the temperature of combustion, as distinguished from closing at a definite combustion temperature, the two switches controlling circuit connections for the circulation controlling means and arranged in such manner that circulation of the fluid medium is permitted only when both of said switches are closed.

In the preferred embodiment of the invention, the heater takes the form of a warm air furnace which is preferably heated by oil or gas in response to changes in the temperature of the space to be heated, the air heated by the warm air furnace being circulated to the space by means of an electric fan or blower which is conjointly controlled by a thermostatic switch that closes when the temperature of the heated air is at or above a predetermined minimum value and a combustion temperature responsive switch that closes upon an increase in the temperature of combustion irrespective of the actual temperature of combustion.

In such a system, the oil burner, gas burner or other heating means is controlled by the main control or room thermostat whereas the fan or blower is controlled by the combustion responsive switch and the air temperature responsive switch, there being no interconnection either mechanical or electrical between the fan or blower and its control system and the heat increasing means and its control system but operation of the fan or blower is indirectly controlled by the main control or room thermostat since the fan or blower can only be operated as a result of an increase in the temperature of combustion and such an increase in the temperature of combustion can only take place as the result of a call for heat by the main control or room thermostat.

Other objects of the invention will be found in the drawing and detailed description and the appended claims.

For a more complete understanding of the invention, reference may be had to the following description and accompanying single drawing which is a diagrammatic showing of one form of the present invention.

Referring to the single drawing, the temperature changing device, herein generally indicated at 10 is shown as comprising a warm air furnace of usual and well-known construction. The warm air furnace 10 includes a combustion pot 11 and a warm air heating chamber 12. Headers 13 communicate with the warm air heating chamber 12 and registers 14 located in the space to be heated. Air is returned from the space to be heated by means of a return duct 15 which is provided with an electrically operated fan or blower 16. It will be evident that upon energization of the electrically operated blower or fan 16, air will be withdrawn from the space to be heated, passed through the air heating chamber 12 where it is heated and then directed to the space to be heated by means of headers 13 and registers 14.

The combustion chamber 11 is provided with the usual stack pipe 17 by means of which the products of combustion are directed to the outside atmosphere. The furnace 10 is herein shown as heated by a main gas burner 18 to which gas is supplied by means of a gas supply pipe 19 controlled by an electrically operated valve 20. The valve 20 is herein shown as comprising a casing 21, a valve stem 22, an electromagnetic winding 23 and a switch 24 which is closed upon opening of the valve by reason of energization of electromagnetic winding 23. For further details of a valve of this general nature, reference may be had to Frederick S. Denison Patent No. 1,607,392 which issued November 16, 1926. The gas which issued from main burner 18 is adapted to be ignited by a pilot light 25 which communicates with gas supply pipe 19 in front of the valve 20 by means of a pilot supply pipe 26.

The gas valve 20 is controlled by a main control switch generally indicated at 30 and herein shown as a room thermostat comprising a curved bimetallic element 31 which controls blades 32 and 33 that are adapted to sequentially engage contacts 34 and 35 upon a fall in space temperature. The arrangement is such that blade 32 first engages contact 34 and blade 33 thereafter engages contact 35 upon a fall in space temperature and blade 33 first disengages contact 35 and blade 32 thereafter disengages contact 34 upon a rise in space temperature. The room thermostat 30 may well take the detailed form shown in Frederick S. Denison Patent No. 1,818,697 which issued August 11, 1931.

The control system for the gas valve 20 also preferably includes a thermostatic switch responsive to the pilot burner 25, such a switch being diagrammatically shown herein as comprising a bimetallic element 37 and a cooperating contact 38, the arrangement being such that contact 38 is engaged by bimetallic element 37 when the pilot light 25 is burning. Such devices, commonly known as safety pilots, are well-known in the art and no further description thereof is thought to be necessary.

A thermostatic switch 40 includes a mercury switch 41 that is operated by a helically coiled bimetallic element 42 which responds to the temperature of the air heated by the furnace 10 and is preferably located in the warm air heating chamber 12. This switch 40 is of the type wherein the mercury switch 41 is moved to closed position when the temperature of the heated air rises to some predetermined minimum value, say 120° F. and remains closed for all temperatures above this value. The arrangement is also preferably such that the switch 41 remains closed on temperature fall until the temperature of the heated air falls to a point somewhat below the temperature at which switch 41 closed, say 110° F. This switch may, if desired, take the form shown in Charles P. Dougherty Patent No. 1,782,530 which issued November 25, 1930.

A second thermostatic switching mechanism indicated at 45, includes a mercury switch 46 and a helically coiled bimetallic operating element 47. The bimetallic element 47 responds to changes in the temperature of combustion and may be conveniently located in the stack pipe 17. The bimetallic element 47 is preferably connected to the switch 46 through a non-positive or slip frictional connecting means such as are now well-known in the art so that the switch 46 is moved to closed position upon a rise in the temperature of combustion and is moved to open position upon a fall in the temperature of combustion as distinguished from operating at predetermined combustion temperatures. The switching mechanism 45 may take the general form shown in Louis A. M. Phelan Patent No. 1,847,036 which issued February 23, 1932.

*Operation*

Low voltage power is supplied to the control system for the gas valve 20 by means of a step down transformer 50 having a high voltage primary 51 and a low voltage secondary 52.

With the parts in the position shown in the drawing, the space temperature is at or above the desired value since blades 32 and 33 are disengaged from contacts 34 and 35. Electromagnetic coil 23 is therefore deenergized and the valve 20 is closed. No gas is issuing from the main burner 18 but the pilot light 25 is operating properly with the result that bimetallic element 37 is in engagement with contact 38. The temperature of the air in air heating chamber 12 is below the setting of the switch 41 which is therefore in open position. The main burner 18 has been out of operation for at least a short time as indicated by the fact that switch 46 is in open circuit position. Blower or fan 16 is not operating and no air is being supplied to the space to be heated.

As the space temperature falls, blade 32 will first engage contact 34 and thereafter blade 33 will engage contact 35 whereupon an energizing circuit for electromagnetic coil 23 will be established as folows: secondary 52, wire 53, contact 38, bimetallic element 37, wire 54, contact 34, blade 32, blade 33, contact 35, wire 55, electromagnetic coil 23 and wire 56 to the other side of secondary 52. Energization of electromagnetic coil 23 raises valve stem 22 to open valve 20 whereby gas is allowed to flow to main burner 18. This gas is ignited by the pilot light 25. Lifting of valve stem 22 also closes switch 24, whereupon a holding circuit for electromagnetic coil 23 is established as follows: secondary 52, wire 53, contact 38, bimetallic element 37, wire 54, contact 34, blade 32, bimetallic element 31, wire 57, switch 24, wire 58, electromagnetic coil 23 and wire 56 to the other side of secondary 52.

Operation of main burner 18 will substantially immediately cause a rise in the temperature of the gases passing through stack pipe 17 with the result that switch 46 will quickly move to its closed circuit position. However, some time will be requred before the temperature of the air in air heating chamber 12 is raised to 120° F., the time required depending upon the initial temperature of this air and the capacity of the main burner 18. When the temperature of the air in air heating chamber 12 has been raised to 120° F. the switch 41 will close whereupon an energizing circuit for blower or fan 16 is established as follows: line wire 60, switch 41, wire 61, switch 46, wire 62, and fan or blower 16 to line wire 63. Energization of blower or fan 16 causes the heated air to be circulated to the space to be heated in an effort to restore the temperature thereof to the desired value. If, for any reason, this circulation of air to the space to be heated should cause the temperature of the air in the air heating chamber 12 to fall to 110° F., then the switch 41 will move to open position to deenergize the fan or blower 16 and the fan or blower 16 will then remain deenergized until the temperature of the air in air heating chamber 12 has been restored to 120° F.

As the room temperature rises, blade 33 will first disengage contact 35 to interrupt the initial energizing circuit for electromagnetic coil 23. However, electromagnetic coil 23 will be maintained energized by the previously described holding circuit. Upon a further increase in the space temperature, blade 32 will disengage contact 34 whereupon the holding circuit for electromagnetic coil 23 will be interrupted and the valve 20 will close, this closing action being accompanied by an opening of switch 24 whereby electromagnetic coil 23 cannot again be energized until blade 33 again engages contact 35. Closing of valve 20 interrupts the supply of gas to the main burner 18 with the result that the temperature of combustion will soon decrease. Since switch 46 is controlled by a non-positive connection from bimetallic element 47 as previously pointed out, the switch 46 will be moved to open circuit position upon a relatively small decrease in the temperature of combustion. As a result, the fan or blower 16 is quickly deenergized after the main burner 18 ceases operating even though the temperature of the air in air heating chamber 12 is still above 110° F.

From the foregoing description, it will be apparent that the present invention provides a system in which the control of the heating plant and the control of the circulating means are entirely segregated electrically and mechanically, simply and efficiently, the arrangement being such that the fan or blower is operated as a result of operation of the heater and the operation of the fan or blower is interrupted substantially immediately upon the heater's ceasing to operate. It is important that the switch 46 should operate upon temperature reversals or temperature changes as distinguished from definite temperature values since the temperature of combustion varies greatly day to day because of variations in atmospheric conditions and is also important because it is desirable to have the blower or fan disconinue its operation quickly when the heater is shut down by reason of the temperature of the space being restored, in order to prevent the continued supplying of heated air to the space after the space temperature has been restored. The provision of switch 41 is important, particularly during the starting cycle of the apparatus, since there is necessarily a lag between a rise in the temperature of combustion and the raising of the air temperature in the air heating chamber to a point sufficiently high to prevent the circulation of relatively cold air to the space to be heated. Therefore, the cooperation of the two switches 41 and 46 substantially immediately conditions the blower or fan for operation whenever the rate of combustion is increased but the actual operation of the blower or fan is made dependent upon there being a sufficiently high temperature in the air heating chamber 12 and, at the same time, the blower or fan 16 is rendered inoperative substantially immediately upon a decrease in the rate of combustion irrespective of the temperature of the air in air heating chamber 12, whereby over-shooting of the space temperature is reduced to a minimum.

A specific form of the invention has been herein shown and described in combination with a gas fired warm air heating system, but it will be readily appreciated that the invention is equally well applicable to other temperature changing systems employing a circulating fluid medium whether they be heating systems or not and irrespective of the specific temperature changing means and circulating fluid employed. I therefore intend to be limited only by the scope of the appended claims.

I claim:

1. In a heating system, the combination with a heater for heating a fluid medium, circulation controlling means for controlling the circulation of said fluid medium, and means associated with the heater for increasing the rate of heat application to said fluid medium, of a main control for operating said heat application rate increasing means, a thermostat responsive to the temperature of the fluid medium in control of said circulation controlling means, and means responsive to an increase in the rate of heat application to said fluid medium and independent of the rate of the heat application thereto for permitting control of said circulation controlling means by said thermostat.

2. A heating system of the class described, comprising, in combination, a heater for heating a fluid medium, circulation controlling means in control of the circulation of said fluid medium, means for increasing the rate of combustion in said heater, a main control for operating said combustion rate increasing means, a thermostat responsive to the temperature of the fluid medium for operating said circulation controlling means when the temperature of the fluid medium is above a predetermined temperature, and a thermostat responsive to increase in the temperature of combustion and operated independently of the actual temperature thereof for conditioning said first-named thermostat to control the circulation controlling means when the temperature of combustion increases a predetermined amount.

3. In combination, a heater for heating a fluid medium, means for increasing the rate of combustion in the heater, a main control for operating said combustion rate increasing means, electrically operated means in control of the circulation of said fluid medium, thermostatic switching means in control of said circulation controlling means and including a switch which is closed when the temperature of the fluid medium is above a predetermined minimum, and thermostatic switching means responsive to the temperature of combustion but independent of the actual value of the combustion temperature and including a switch that closes on combustion temperature increase for conditioning said first-named thermostatic switching means to control the circulation controlling means.

4. In combination, a heater for heating a fluid medium, electrically controlled combustion rate increasing means therefor, a main control switch in control of said combustion rate increasing means, an electrically operated circulator for circulating said fluid medium, a switch responsive to the temperature of said fluid medium which closes when the temperature thereof is above a predetermined minimum, a switch responsive to changes in the temperature of combustion which closes upon an increase in the temperature of combustion and independently of the actual value thereof, and a circuit for said circulator conjointly controlled by said two switches.

5. In combination, a warm air furnace, an electrically controlled fan for circulating the air heated by said furnace, means for increasing the rate of combustion in the furnace, a main control for operating the combustion rate increasing means, a thermostatic switch responsive to the temperature of the heated air and which closes when the temperature of the heated air is above a predetermined minimum, a thermostatic element responsive to the temperature of combustion, a switch, non-positive transmission means connecting said element and switch whereby the switch is moved to closed circuit position upon an increase in the temperature of combustion and is moved to open position upon a relatively small decrease in the temperature of combustion but independent of the actual value thereof, and circuit connections between said fan and switches for completing a circuit to said fan only when both of said switches are closed.

6. In a heating system, the combination with a heater for heating a fluid medium, circulation controlling means for controlling the circulation of said fluid medium, and a burner associated with the heater for increasing the rate of heat application to said fluid medium, of a main control for operating said burner, a thermostat responsive to the temperature of the fluid medium in control of said circulation controlling means, and means responsive to an increase in the temperature of combustion of the burner and independent of the actual temperature of combustion for permitting control of said circulation controlling means by said thermostat.

7. A heating system of the class described, comprising, in combination, a heater for heating a fluid medium, circulation controlling means in control of the circulation of said fluid medium, a burner for increasing the rate of combustion in said heater, a main control for operating said burner, a thermostat responsive to the temperature of the fluid medium for operating said circulation controlling means when the temperature of the fluid medium is above a predetermined temperature, and a thermostat responsive to increase in the temperature of combustion produced by operation of the burner and operated independently of the actual temperature of combustion for conditioning said first-named thermostat to control the circulation controlling means.

8. In combination, a heater for heating a fluid medium, a burner for increasing the rate of combustion in the heater, a main control for operating said burner, electrically operated means in control of the circulation of said fluid medium, thermostatic switching means in control of said circulation controlling means and including a switch which is closed when the temperature of the fluid medium is above a predetermined minimum, and thermostatic switching means responsive to the temperature of combustion produced by operation of the burner but independent of the actual value of the combustion temperature and including a switch that closes on combustion temperature increase for conditioning said first-named thermostatic switching means to control the circulation controlling means.

9. In combination, a heater for heating a fluid medium, an electrically controlled burner for heating said heater, a main control switch in control of said burner, an electrically operated circulator for circulating said fluid medium, a switch responsive to the temperature of said fluid medium which closes when the temperature thereof is above a predetermined minimum, a switch responsive to changes in the temperature of combustion which closes upon an increase in the temperature of combustion and independently of the actual value thereof, and a circuit for said circulator conjointly controlled by said two switches.

10. In combination, a warm air furnace, a burner for heating the furnace, a main control for operating the burner, a thermostatic switch responsive to the temperature of the heated air and which closes when the temperature of the heated air is above a predetermined minimum, a thermostatic element responsive to the temperature of combustion, a switch, non-positive transmission means connecting said element and switch whereby the switch is moved to closed and open circuit positions upon initial increase and decrease in the temperature of combustion but independent of the actual value thereof, an electrical fan for circulating said heated air, and circuit connections between said fan and switches for completing a circuit to said fan only when both of said switches are closed.

11. In a heating system of the type wherein a space to be heated is heated by a circulating medium, the combination with means for varying the rate of heat application to said circulating medium, a main control responsive to the temperature of the space for controlling said means, and circulation controlling means for controlling the circulation of the circulating medium; of a control system for the circulation controlling means comprising a thermostat responsive to the temperature of the circulating medium, means responsive to a change in the rate of heat application to said circulating medium, and connections between said thermostat and means for conjointly controlling the operation of said circulation controlling means.

12. In a heating system of the type wherein a space to be heated is heated by a circulating medium, the combination with means for varying the rate of heat application to said circulating medium, a main control responsive to the temperature of the space for controlling said means, and electrically operated circulation controlling means for controlling the circulation of the circulating medium; of a control system for the circulation controlling means comprising a thermostatic switch responsive to the temperature of the circulating medium and closed when the temperature thereof is above a desired value, a switch responsive to a change in the rate of heat application to said circulating medium and closed upon an increase in said rate, and an energizing circuit for said circulation controlling means controlled by the conjoint action of said switches.

13. In combination, a heater for heating a circulating medium for heating a space, combustion rate varying means for varying the rate of combustion in the heater, a main control responsive to the temperature of the space for operating said combustion rate varying means, a thermostat responsive to the temperature of the circulating medium, means responsive to a change in the rate of combustion, and circulation controlling means conjointly controlled by said last-named means and thermostat.

14. In combination, a heater for heating a circulating medium for heating a space, combustion rate varying means for varying the rate of combustion in the heater, a main control responsive to the temperature of the space for operating said combustion rate varying means, a thermostatic switch responsive to the temperature of the circulating medium and closed when the temperature thereof is above a predetermined value, a switch responsive to a change in the rate of combustion and closed upon an increase in said rate, and electrically controlled circulation controlling means conjointly controlled by said switches.

15. In combination, a burner for heating a circulating medium which heats a space, a main control responsive to the space temperature for controlling combustion at said burner, a thermostat responsive to changes in the temperature of combustion but independent of the temperature value thereof, a thermostat responsive to the temperature of the circulating medium, and circulation controlling means controlled by the conjoint operation of said thermostats.

16. In combination, a burner for heating a circulating medium which heats a space, a main control responsive to the space temperature for controlling combustion at said burner, a thermostatic switch which is closed and opened respectively upon a rise and fall in the temperature of combustion, a thermostatic switch which closes when the temperature of the circulating medium rises to a predetermined point, and electrically operated circulation controlling means controlled by the conjoint operation of said switches.

17. In combination, a warm air furnace for heating a space, combustion rate varying means for varying the rate of combustion in the furnace, a main control responsive to space temperature in control of said combustion rate varying means, a thermostatically controlled member moved upon reversals in the temperature of combustion but independenty of the temperature value thereof, a thermostat responsive to the temperature of the air heated by the furnace, and a fan for circulating the air heated by the furnace controlled by the conjoint action of said member and thermostat.

18. In combination, a warm air furnace for heating a space, electrically operated combustion rate varying means for varying the rate of combustion in the furnace, a main control switch responsive to space temperature in control of said combustion rate varying means, a thermostatically controlled switch moved to closed and open positions upon a rise and fall in the temperature of combustion but independently of the temperature value thereof, a thermostatic switch responsive to the temperature of the air heated by the furnace and closed when the temperature thereof rises to a given value, an electrical fan for circulating the air heated by the furnace, and circuit connections for energizing said fan only when said two last-named switches are closed.

19. In a temperature control system, in combination, a temperature changing device for changing the temperature of a circulating fluid medium, means associated with the temperature changing device for varying the rate at which the temperature of said fluid medium is changed, a main control for controlling the operation of said rate varying means, a thermostat responsive to the temperature of said fluid medium, means responsive to a change in the rate at which the temperature of said fluid medium is changed, and circulation controlling means for controlling the circulation of said fluid medium conjointly controlled by said thermostat and said last-named means.

20. A temperature changing system of the class described, comprising, in combination, a temperature changing device for changing the heat content of a circulating fluid medium, a main control associated with said temperature changing device for varying the rate of operation thereof, a thermostatic switch responsive to the heat content of the fluid medium and closed when the heat content thereof is at a predetermined value, a switch responsive to changes in the rate of operation of said temperature changing device and closed upon an increase in said rate, an electrically operated circulation controlling means for controlling the circulation of said fluid medium, and an energizing circuit therefor controlled by the conjoint action of said two switches.

21. In a temperature control system, in combination, a temperature changing device arranged to change the temperature of a circulating medium, means associated with the temperature changing device operative to vary the rate at which the temperature of the fluid medium is changed, a main control in control of the rate varying means, means responsive to reversals in the trend of the temperature of the fluid medium, circulation controlling means in control of the circulation of said fluid medium, and connections between said temperature responsive means and circulation controlling means arranged to operate the latter to permit circulation of the fluid medium upon a change in trend of the fluid medium temperature in one direction and to prevent circulation of the fluid medium upon a change in trend of the fluid medium temperature in the other direction.

22. A heating system of the class described, comprising, in combination, a heater arranged to heat a heating fluid, circulation controlling means in control of the circulation of the heating fluid, means associated with said heater operative to increase or decrease the rate of heat application to said heating fluid, a main control in control of the heat application increasing and decreasing means, and means responsive to a change in trend of the heat content of the heating fluid in control of the circulation controlling means.

23. In combination, a temperature changing device arranged to change the temperature of a temperature changing fluid, electrically controlled circulation controlling means in control of the circulation of said fluid, electrical means associated with the temperature changing device for varying the rate at which the heat content of the fluid is changed, main control switching means in control of said electrical means, and switching means operated by reversals in trend of the heat content of the fluid in control of the circulation controlling means.

24. In combination, a heater arranged to heat a circulating medium for heating a space, an electrical device in control of the flow of the circulating medium, switching means actuated upon reversals in the temperature trend of the circulating medium in control of said device, electrical means operative to change the rate of heat application to the circulating medium, and a space temperature responsive switching means in control of said electrical means.

25. In combination, a warm air furnace for heating air to be circulated to a space, electrical means in control of the rate of heat application to the circulating air, a space temperature responsive switching means in control of the electrical means, an electrical blower arranged to circulate the heated air to the space, a thermostatic switch responsive to changes in the temperature trend of the circulating air and arranged to close when the air temperature trend changes from a falling temperature to a rising temperature, and a blower energizing circuit control by said switch.

FREDERICK S. DENISON.